United States Patent [19]
Tsukada et al.

[11] Patent Number: 4,794,728
[45] Date of Patent: Jan. 3, 1989

[54] APPARATUS FOR HYDROPONICS

[75] Inventors: Keiichi Tsukada; Hirotaka Demura; Tokushi Yamada, all of Sapporo, Japan

[73] Assignee: 501 Hokkai Giken Kogyo Ltd., Sapporo, Japan

[21] Appl. No.: 87,544

[22] Filed: Jul. 10, 1987

[30] Foreign Application Priority Data

Mar. 31, 1987 [JP] Japan .......................... 62-046887[U]

[51] Int. Cl.$^4$ .......................................... A01G 31/02
[52] U.S. Cl. .......................................... 47/64; 47/80; 47/84
[58] Field of Search .............. 47/59, 56, 63, 64, 77, 47/84, 87, 39, 80; 71/27; 229/120.03, 121; 220/408, 410; 206/423

[56] References Cited

U.S. PATENT DOCUMENTS

| 2,148,048 | 2/1939 | Gray | 47/84 |
| 2,688,431 | 9/1954 | Loeb et al. | 47/84 |
| 3,872,621 | 3/1975 | Greenbaum | 206/423 |
| 4,726,468 | 2/1988 | Hesser et al. | 47/84 |

FOREIGN PATENT DOCUMENTS

| 169687 | 1/1986 | European Pat. Off. | 47/62 |
| 1398671 | 3/1965 | France | 229/120.03 |
| 891078 | 3/1962 | United Kingdom | 47/84 |

*Primary Examiner*—Robert A. Hafer
*Assistant Examiner*—Danton D. DeMille
*Attorney, Agent, or Firm*—Wegner & Bretschneider

[57] ABSTRACT

An apparatus for hydroponics comprising (a) a box made of cardboard comprising a bottom wall, a surrounding wall and a cover, wherein the surrounding wall comprises at least two sheets and a space is formed between the two sheets, and the cover consists of at least two parts which can be separately opened and closed, and at least one of the parts has at least one opening; (b) a container made of water-impermeable material which can be contained in the box; and (c) a porous solid medium for plant culture comprising a culture bed which can be contained in the water-impermeable container and at least one plant support, wherein the plant support protrudes through the opening of the cover part of the apparatus, beyond the cover part, and an upper surface of the culture bed and an inner surface of the cover define a space therebetween; and the use thereof.

7 Claims, 2 Drawing Sheets

APPARATUS FOR HYDROPONICS

BACKGROUND OF THE INVENTION

1. Field of the Invention

The present invention relates to an apparatus for hydroponics, particularly such an apparatus used for growing plants in a house.

2. Description of the Related Art

The use of hydroponics is extensive in the farming industry, and in this usage a minute control of the environment is necessary which is complicated and expensive, and an apparatus and method for hydroponics for plant growth which is not complicated and expensive and can be used in a house, preferably on, for example, a table, is as yet unavailable.

SUMMARY OF THE INVENTION

Accordingly, an object of the present invention is to provide an apparatus and method for hydroponics that can be used growing plants in a house.

More particularly, the present invention provides an apparatus for hydroponics comprising (a) a box made of cardboard comprising a bottom wall, a surrounding wall and a cover, wherein the surrounding wall comprises at least two sheets and a space is formed between the two sheets, and the cover consists of at least two parts which can be separately opened and closed, an at least one of the parts has at least one opening;

(b) a container made of a water-impermeable material which can be contained in said box; and (c) a porous solid medium for plant culture comprising a culture bed which can be contained in said water-impermeable container and at least one plant support, wherein, when the apparatus is used, the plant support protrudes through said opening of the cover part beyond the cover part, and an upper surface of the culture bed and an inner surface of the cover define a space therebetween.

The present invention also provides a method for hydroponics using the above-mentioned apparatus.

DESCRIPTION OF THE PREFERRED EMBODIMENT

Figure 1:
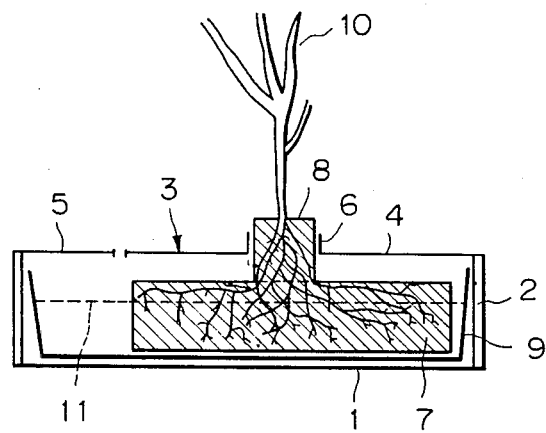
FIG. 1 is a cross sectional view of an apparatus of the present invention schematically showing the apparatus when used for culturing a plant.

FIG. 1 is a cross section view of an apparatus of the present invention. In this figure, a box comprising a bottom wall 1, a surrounding wall 2 and a cover 3 is made of cardboard, because cardboard has an appropriate permeability for air and moisture. Therefore, the use of cardboard ensures that oxygen required by the roots of a plant is supplied from outside of the box through the walls and cover thereof, and carbon dioxide generated from the metabolism of the roots is discharged through the wall and cover of the box. Moreover, since the cardboard is permeable for moisture, and thus water vapor generated from a liquid nutrient medium can be discharged through the walls and cover of the box, even if an environmental temperature is too high for growth of the plant, an appropriate temperature for plant growth is maintained in the box.

The surrounding wall 2 comprises at least two sheets of cardboard, and these two sheets define an air space. This structure of the surrounding wall 2 maintains an appropriate temperature inside the box by a combination of the heat insulation effect provided by the cardboard and the heat insulation effect of air layer formed between the two sheets of cardboard. Although the number of the sheets is not critical at least two sheets must be must used. Namely, the surrounding wall should preferably consist of two sheets, to ensure the simplest structure and lowest production cost of the box. The space between two sheets is usually 3 mm to 8 mm.

Figure 2:
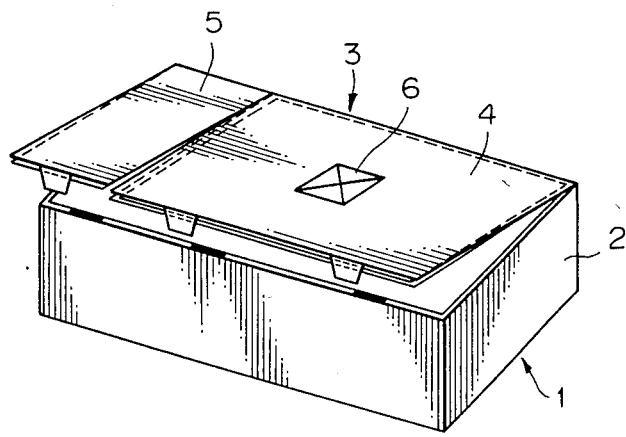
FIG. 2 is a view of a box of an apparatus of the present invention.
Figure 3:
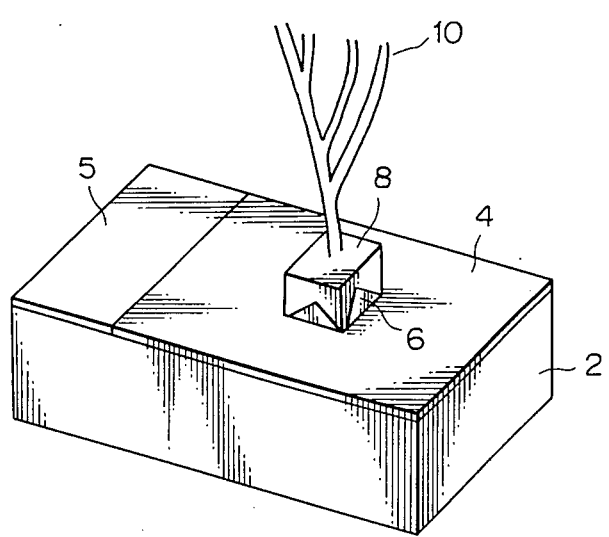
FIG. 3 is a view of an assembled apparatus of the present invention when in use.

A cover 3 of the box consists of at least two parts, and these parts of the cover can be separately opened and closed. In an embodiment wherein the cover 3 consists of two parts 4 and 5 as shown in FIG. 1, the cover part 5 can be easily opened and closed to control a temperature of and moisture in the box. Moreover, a periodical supplementing of liquid nutrient medium, which is necessary during plant culturing, can be easily carried out by opening the cover part 5. Only one cover part 4 is usually provided, but more than one such cover part 4 may be used. The cover part 4 has at least one opening 6, which is conveniently formed by cross-cutting the cover part 4 as shown in FIG. 2, and folding the thus-formed triangular-shaped pieces as shown in FIG. 3. When an apparatus of the present invention is assembled to be used in the hydroponics of a plant, a plant support 8 made of a solid medium is protruded through the opening 6 beyond the cover part 4. When more than one cover part 4 and/or opening 6 is provided, more than one plant of the same or different kinds can be grown in one apparatus.

The shape of the box is not critical, but preferably is parallelopiped on.

The height of the box is usually 5 cm to 12 cm. Although the size of the box is not critical, if the box is too small, a water-impermeable container 9, which is contained in the box, cannot contain a sufficient volume of liquid nutrient medium for culturing a plant. If the box is too large, the present apparatus can not be conveniently used in a house on, for example, a table. Therefore, the length of the box is preferably less than 80 cm, more preferably 30 to 50 cm.

A container 9 made of water-impermeable material is completely contained in the above-mentioned box. The water-impermeable material may be any material that is water-impermeable, such as a metal or a known synthetic polymer. A synthetic polymer such as high impact polystyrene is preferable from the practical point of view of production and use of the container.

A solid medium for plant culture comprises a culture bed 7 and at least one plant support 8. The culture bed 7 and the plant support 8 are preferably made of the same material, but as separate blocks which are assembled for use. The solid medium for plant culture can be any material in which roots of a plant can grow and into which a liquid can permeate. Such materials include synthetic porous polymers, such as urethane foams, fibrous mineral material, block-formed pearlite, and vermiculite, and block-formed natural products such as peatmoss, sawdust, and the like. According to the present invention, preferably a fibrous mineral material is used as the solid medium for plant culture. This material is prepared by mixing diabase, limestone and coke, melting the mixture at a temperature of about 1600° C., and converting the melt to a fibrous woolly material which is then pressed to form the desired material. Such materials are commercially available, for example, Rock Wool (Rock Wool, Denmark), Rock Fiber (Nitto Bo, Japan), Espran (Shin-nittetsu Kagaku, Japan), Ni Wool (Taiheiyo Kinzoku, Japan), and the like. Rock Wool having a hydrophilic property is preferable, in that it provides a good balance between gas, liquid and solid phases when soaked in a liquid nutrient medium which balance provides a good plant growth.

As stated above, the solid medium of the present invention comprises a culture bed 7 and a plant support 8 positioned on the culture bed 7. A small hole is made at the top of the plant support 8 and seeds of a desired plant are seeded into that hole. Since the seeds are positioned at a level higher than the upper surface of the culture bed, roots which extend from the seed into the culture bed can directly take in oxygen from the upper surface of the culture bed. This is very advantageous for hydroponics.

The upper surface of the culture bed and the inner or lower surface of the cover 3 define a space therebetween, i.e., an air layer whose thickness is preferably about 3 to 30 mm. This structure is very advantageous for the direct intake of oxygen by the plant roots.

Although the solid medium comprising the culture bed 7 and the plant support 8 can be in an integrated form, the culture bed and the plant support are preferably made as separate blocks. Such a structure is advantageous from the point of view of production and packaging of the present apparatus.

The shape of the culture bed is not critical, but is usually a parallelopipedon. The plane size of the culture bed is such that it can be contained in the water impermeable container. The height of the culture bed is about 3 to 10 cm. The shape of the plant support is not critical, but is usually a parallelopipedon, cube or column. In all cases, the height of the plant support is about 3 to 10 cm.

Preferably, the plant support is covered with a water-impermeable sheet on its side surface to maintain its shape, to inhibit evaporation of water from the surface, and to inhibit projection of roots from the surface.

The present apparatus can be used to culture various kinds of plants, such as lettuce, salad lettuce, spinach, mustard, cabbage, tomatoes, cucumber, beans, peas, pepper, melon, egg plant, water melon, pumpkin, radish, carrot, marigold, cyclamen, geranium, petunia, carnation, and the like. To culture such plants, the solid medium is put into the water-impermeable container, and the container is put into the box.

A liquid nutrient medium is poured into the container so that the lower major part of the culture bed is saturated with the medium and the upper remaining part of the culture bed and the entire plant support are exposed to air. In this case, the liquid nutrient medium is drawn up into the upper part of the culture bed and the plant support by capillary action. Exposure of the upper part of the culture bed allows the roots of plant, which extend into the culture bed, to intake oxygen directly from the surface of the culture bed.

The liquid nutrient medium which can be used for the present invention is one of the conventional liquid mediums used for hydroponics. Therefore, a solid mixture of the components of the medium is commercially available, and this mixture is dissolved in water according to the instructions of the maker of the mixture. An example of the nutrient components in the solid mixture is as follows: total nitrogen 10.1%, $NH_4$-nitrogen 1.5%, $NO_3$-nitrogen 7.5% urea-nitrogen 1.0%, $P_2O_5$ 8.0%; $K_2O$ 24.0%, $MgO$ 5.0%, $Fe$ 0.18%, $MnO$ 0.10%, and $B_2$ 0.10% (all by weight). 1.5 g of this mixture is dissolved in 1 l of water prior to use.

Next, the cover of the bo is closed so that the plant support 8 of the solid medium protrudes through the opening 6 of the cover part 4, beyond the cover part 4.

During the culturing, fresh liquid nutrient medium is added to the container, because the liquid medium gradually vaporizes through the culture bed surface and leaves of the plant, and because nutrient components are consumed by the plant. Since the cover part 4 cannot be opened after the roots of plant have extended from the plant support 8 to the culture bed 7, the supplementing of the fresh liquid medium is carried out by opening the cover part 5.

In such a manner, the growth of the target plant 10 is realized.

The present apparatus has a very compact construction and, therefore, can be easily used for hydroponics at home on, for example, a table or desk.

Since the box of the present apparatus is made of cardboard, and the surrounding wall of the box is comprised at least two sheets, and these sheets form a space, i.e., air layer, therebetween, the present box exhibits an appropriate heat insulation effect and an appropriate permeation for air and moisture. This structure can, therefore, maintain a required temperature, moisture, and gas composition inside the box at a condition appropriate for the growth of plant. Therefore, by using the present apparatus, the hydroponics of various kinds of plant can be carried out in a house without the need for a means of environmental control or a complicated culture control.

Moreover, since the solid culture medium comprises the culture bed 7 and plant support 8, and the seeds of plant are seeded at a top of the plant support 8 so that the position of the seeds is substantially higher than the upper surface of the culture bed, and the upper surface of the culture bed and inner or lower surface of the cover 3 of the box define a space, i.e., an air layer, therebetween, the roots of a plant can intake oxygen directly from the upper surface, which has large area, of the culture bed. This is very advantageous for hydroponics.

We claim:

1. An apparatus for hydroponics comprising
   (a) a box made of cardboard comprising a bottom wall, a surrounding wall and a cover, wherein the surrounding wall comprises at least two sheets and a space is formed between the two sheets, and the cover consists of at least two parts which can be separately opened and closed, and at least one of the parts has at least one opening defined within the perimeter of the respective part and extending therethrough;
   (b) a container made of water-impermeable material contained in the box; and
   (c) a porous medium comprising said material for plant culture comprising a shaped culture bed contained in the water-impermeable container and at least one plant support extending from the culture bed, wherein the plant support protrudes through said opening of the cover part of the apparatus, beyond said cover part, and an upper surface of the culture bed and an inner surface of the cover define a space therebetween.

2. An apparatus according to claim 1, wherein the porous solid medium for plant culture is selected from the group consisting of a hydrophilic porous mineral material and a porous synthetic polymer.

3. An apparatus according to claim 2, wherein the hydrophilic mineral material is Rock Wool.

4. An apparatus according to claim 2, wherein the porous synthetic polymer is urethane foam.

5. An apparatus according to claim 1, wherein the height of the culture bed is between 3 to 10 cm.

6. An apparatus according to claim 1, wherein the dimension between the upper surface of the culture bed and the inner surface of the cover is between 5 mm to 7. An apparatus according to claim 1 wherein the plant support is substantially cubic and has a dimension of between 3 to 10 cm.

* * * * *